Patented Dec. 3, 1940

2,223,453

UNITED STATES PATENT OFFICE 2,223,453

ESTERS OF PERYLENE-CARBOXYLIC ACIDS AND A PROCESS OF PRODUCING THEM

Karl Koeberle and Otto Schlichting, Ludwigshafen-on-the-Rhine, Germany, assignors to General Aniline & Film Corporation, a corporation of Delaware No Drawing. Application December 27, 1937, Serial No. 182,012. In Germany December 31, 1936

10 Claims. (Cl. 260—475)

The present invention relates to esters of perylene carboxylic acids and a process of producing them.

We have found that pure perylene carboxylic acid esters are obtained by reacting perylene carboxylic acids in one operation with a halogen compound converting each group —COOH into —COHal, and an alcohol.

As initial materials there may be employed any, also polybasic, perylene carboxylic acids or their salts. Furthermore, there may be mentioned carboxylic acids of benzoperylenes, dibenzoperylenes, pyridinoperylenes, pyrimidinoperylenes, perylenequinones, azaperylenes, hydroxyperylenes and perylene imides. All these initial materials may contain further atoms or atomic groups in the nucleus. For the esterification there may be used any mono- or polyvalent alcohols, for example aliphatic alcohols such as methyl-, ethyl-, butyl-, isobutyl-, or isoamyl alcohol, furthermore octyl-, dodecyl-, octodecyl- and octodecenyl alcohols, glycols, glycerine, and also aromatic alcohols such as benzyl alcohol, hydroaromatic alcohols such as cyclohexanol, hexahydrobenzyl alcohol, terpineol and abietinol, and finally phenols, cresols and phenols containing higher molecular alkyl groups.

Suitable halogen compounds which convert the carboxyl group into the carboxylic halide group are for example the halides of phosphorus and sulphur, especially phosphorus trichloride and pentachloride, phosphorus tribromide and thionylchloride, furthermore benzoylchloride and benzotrichloride.

The reaction is usually carried out in high boiling diluents such as monochlorbenzene, ortho-dichlorbenzene, trichlorbenzene or nitrobenzene wherein the perylene carboxylic acid is heated with the corresponding amount of the halogen compound. Then, preferably after some time, the alcohol is added to the reaction mixture and it is heated until the formation of the esters is completed. Pure perylene carboxylic acid esters are thus obtained in a good yield. They form yellow to yellowish-red, mostly well crystallized compounds which dissolve in organic solvents giving a yellow to red coloration and mostly a very powerful fluorescence. They may be incorporated into natural and synthetic organic masses, rubber, polymerization products, hydrocarbons, oils, fats, waxes, alcohols and so on. The esters of dicarboxylic acids of perylene itself, especially with aliphatic alcohols such as butyl or isobutyl alcohol, are especially suitable for characterizing motor fuels and the like. They are readily soluble therein, for example in benzene, gasoline, and mixtures of such hydrocarbons with methanol or ethanol. The solutions show a very powerful yellow-green fluorescence even in high dilution. They do not leave the least residue in the motor.

The following examples will further illustrate how the said invention may be carried out in practice but the invention is not restricted to these examples. The parts are by weight.

Example 1

A mixture of 15 parts of perylene-3-carboxylic acid, 12 parts of phosphorus pentachloride and 100 parts of nitrobenzene is heated while stirring at from 100 to 110° C., until hydrogen chloride no longer escapes which is the case after about an hour. The mixture is then allowed to cool at from 70 to 80° C., 50 parts of methanol are added and the whole is stirred for another hour at from 70 to 75° C. After cooling the crystal pulp is filtered off by suction, washed with methanol and dried. 13 parts of perylene-3-carboxylic acid methyl ester are thus obtained in the form of yellow needles (melting point 185° to 190° C.). By redissolution from orthodichlorbenzene yellow-red laminae (melting point 198°–200° C.) are obtained. The ester dissolves in strong sulphuric acid giving a red-violet coloration and a powerful red fluorescence. In organic solvents such as alcohol, acetone, hydrocarbons and mineral oils, it is soluble giving a yellow to yellow-red coloration and a strong green fluorescence.

If ethanol is employed instead of methanol, the perylene-3-carboxylic acid ethyl ester is obtained in the form of yellow needles (melting point 185–187° C.).

By using other alcohols there are obtained in the same way perylene-3-carboxylic acid propyl ester, perylene-3-carboxylic acid butyl ester (golden-yellow laminae melting at from 155° to 157° C.), perylene-3-carboxylic acid isobutyl ester (golden-yellow laminae melting at from 162° to 164° C.) and perylene-3-carboxylic acid isoamyl ester.

Example 2

A mixture of 10 parts of perylene-3-carboxylic acid, 8 parts of phosphorus pentachloride and 75 parts of nitrobenzene is heated while stirring at from 110–120° C. until hydrogen chloride no longer escapes. Then 55 parts of octodecenyl alcohol are added to the reaction mixture; it is stirred at from 110° to 120° C. for an hour, diluted with 100 parts of methanol after cooling, the crystal pulp is filtered off by suction and washed with methanol. After working up perylene-3-carboxylic acid octodecenyl ester is obtained in the form of a yellow crystal powder (melting point 110–112° C.). By redissolution from chlorbenzene the ester is obtained in the form of yellow needles. It is difficultly soluble in alcohols, more readily in hydrocarbons and mineral oils giving a yellow to yellow-red coloration and a green fluorescence.

In the same manner, there may be obtained perylene-3-carboxylic acid dodecyl ester (lemon-yellow laminae melting at from 118° to 120° C.) and octodecyl ester (yellow laminae melting at from 117° to 119° C.). Their properties are similar to those of the octodecenyl ester.

Example 3

A mixture of 34 parts of most finely ground 3,9- and 3,10-perylene-dicarboxylic acid, 45 parts of phosphorus pentachloride and 300 parts of nitrobenzene is heated in a stirring vessel for about 4 hours at from 120 to 130° C., then allowed to cool to 110° C., whereupon 100 parts of isobutyl alcohol are added. The mixture is heated at from 100 to 110° C. for another hour. After cooling, the crystal pulp is filtered off by suction, washed with isobutyl alcohol and methanol and dried. The perylene dicarboxylic acid diisobutyl ester thus formed is a yellow-red crystal powder having a melting point at between 208–210°. After redissolution from trichlorbenzene for several times, the melting point is 232° C. The analysis of the crude end product already corresponds exactly to a diisobutyl ester of a perylene dicarboxylic acid. It is apparently a mixture of 3,9- and 3,10-perylene dicarboxylic acid diisobutyl ester which may be separated by repeated crystallization. The fraction having the lower solubility and the higher melting point is the 3,9-perylene dicarboxylic acid diisobutyl ester, because the perylene dicarboxylic acid diethyl ester prepared in the same manner has a similar behavior. (By recrystallizing the crude perylene-dicarboxylic acid diethyl ester for 5 times it is obtained in the form of beautiful yellow-red laminae having a melting point of 275° C.)

Instead of isobutyl alcohol or ethanol, methanol, isopropyl alcohol, normal-butanol, isoamyl alcohol, normal-heptyl alcohol, normal-octyl alcohol or benzyl alcohol may be employed giving the corresponding esters, i. e. perylene dicarboxylic acid dimethyl ester (yellow-red needles having a melting point of 253–256° C.), perylene-dicarboxylic acid diisopropyl ester (golden-yellow laminae having a melting point of 179–181° C.), perylene-dicarboxylic acid diisoamyl ester (golden-yellow laminae), perylene-dicarboxylic acid di-normal-heptyl ester (orange-yellow laminae having a melting point of 136–138° C.), perylene-dicarboxylic acid di-normal-octyl ester (yellow laminae having a melting point of 144–146° C.) and perylene dicarboxylic acid dibenzyl ester (yellow laminae). The perylene-dicarboxylic acid dicyclohexyl ester (yellow-red crystal powder) prepared in a similar manner melts at 261–264° C. and the perylene-dicarboxylic acid didodecyl ester (yellow laminae) melts at 143–145° C.

If 1 part of the di-isobutyl ester of 3,9- or 3,10-dicarboxylic acid, or also the crude mixture of both esters, is dissolved in 60 parts of gasoline and this solution is added to 500,000 parts of a motor fuel consisting of gasoline and methanol (ratio 4:1), it shows a very vivid and beautiful yellow-green fluorescence. In the same manner, also pure hydrocarbons such as gasoline or benzene, or mixtures of such hydrocarbons with each other, if desired also with alcohols, may be rendered fluorescent.

Example 4

A mixture of 10 parts of perylene-3-carboxylic acid, 8 parts of phosphorus pentachloride and 80 parts of nitrobenzene is heated at from 100 to 110° C. for about one hour while stirring. The bulk of phosphorus oxychloride thus formed is then evaporated together with a little nitrobenzene under reduced pressure and 15 parts of cyclohexanol are added to the residue. The mixture is stirred at from 100 to 110° C. for another hour, allowed to cool, diluted with 100 parts of methanol, whereupon the crystal pulp is filtered off by suction and washed with methanol. The perylene-3-carboxylic acid cyclohexyl ester thus formed is a yellow-red crystal powder which melts at between 197–199° C. and which dissolves in organic solvents giving a yellow-red coloration and a green fluorescence.

When using phenol instead of cyclohexanol, the perylene-3-carboxylic acid phenyl ester is obtained as a yellow-red crystal powder having a melting point of 237–240° C. When using instead of phenol glycol or ethyl glycol the perylene-3-carboxylic acid glycol ester (red-yellow-crystal powder having a melting point of 179–181° C.) or the perylene-3-carboxylic acid ethyl glycol ester (yellow-red laminae having a melting point of 142–144° C.) are obtained.

When using terpineol or abietinol the corresponding esters of perylene-3-carboxylic acid are obtained.

Example 5

A mixture of 10 parts of perylene-3-carboxylic acid, 10 parts of thionyl chloride and 100 parts of monochlorbenzene is heated in a stirring vessel at from 70–80° C. for 2 hours and then at from 100–110° C. for another 3 hours. The excess thionyl chloride and chlorbenzene are then evaporated and, after adding 12 parts of octodecyl alcohol, the reaction mixture is heated at from 110 to 120° C. for another hour, allowed to cool, diluted with 100 parts of methanol, whereupon the resulting perylene-3-carboxylic acid octodecyl ester is filtered off by suction and washed with methanol. It is a yellow crystal powder which has a greasy touch and is difficultly soluble in alcohols but more readily soluble in hydrocarbons and mineral oils giving a yellow coloration and a strong green fluorescence.

Perylene-carboxylic acid esters are also obtained in a similar manner from benzperylene carboxylic acids, as for example from 1.12-benzperylene-carboxylic acids, or 2.3.10.11-dibenzperylene carboxylic acids, which are obtainable from the corresponding dibenzperylene (cf. Berichte der Deutschen Chemischen Gesellschaft, vol. 65, page 846) by treatment with bromine, replacing bromine by cyano groups and saponification, or from carboxylic acids which can be prepared in a corresponding manner from pyridinoperylenes or azaperylenes, by treatment with isoamyl alcohol or octodecyl alcohol or others, also polyhydric alcohols in which the hydroxyl groups (save one) may be esterified also with other acids, as for example acetic acid, butyric acid, ricinoleic acid, oleic acid, stearic acid or other fatty acids, or etherified, as for example with butanol, hexyl alcohol, cyclohexyl alcohol and dodecyl alcohol or octodecyl alcohol. Among the compounds thus obtained, those having higher molecular alkyl- or cycloalkyl radicles are distinguished by especially good solubility in organic solvents, fat, waxes, artificial compositions and the like.

Perylene carboxylic acids of the said kind which contain other atoms, as for example halogen atoms or simple atomic groups, as for example hydroxyl, nitro, cyano or alkyl, for example methyl or propyl groups, may in the same manner be converted into esters by means of most various alcohols.

What we claim is:

1. A process of producing esters of perylene carboxylic acids which comprises reacting a perylene carboxylic acid selected from the class consisting of perylene 3-carboxylic acid, perylene 3,9-dicarboxylic acid and perylene 3,10-dicarboxylic acid in one operation with a halogen compound selected from the class consisting of phosphorus halides and sulphur halides converting each group —COOH into —COHal, and an alcohol.

2. A process of producing esters of perylene carboxylic acids which comprises reacting a perylene carboxylic acid selected from the class consisting of perylene 3-carboxylic acid, perylene 3,9-dicarboxylic acid and perylene 3,10-dicarboxylic acid in one operation with phosphorus pentachloride and an alcohol.

3. A process of producing esters of perylene carboxylic acids which comprises reacting a perylene carboxylic acid selected from the class consisting of perylene 3-carboxylic acid, perylene 3,9-dicarboxylic acid and perylene 3,10-dicarboxylic acid in one operation with thionylchloride and an alcohol.

4. An ester of a perylene carboxylic acid selected from the class consisting of perylene 3-carboxylic acid, perylene 3,9-dicarboxylic acid and perylene 3,10-dicarboxylic acid each ester radical containing four carbon atoms.

5. A perylene dicarboxylic ester of the general formula

wherein one of the positions marked X is occupied by a group —COOR, R being an alkyl radical having four carbon atoms.

6. A perylene dicarboxylic ester of the general formula

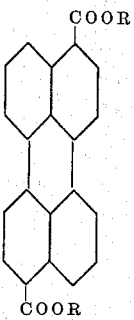

wherein R stands for an alkyl radical having four carbon atoms.

7. The perylene dicarboxylic ester having the formula

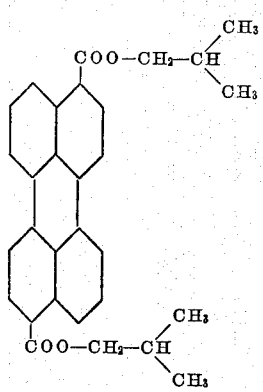

8. A perylene dicarboxylic ester of the general formula

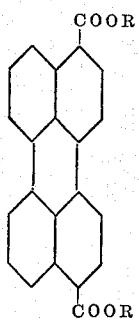

wherein R stands for an alkyl radical having four carbon atoms.

9. The perylene dicarboxylic ester having the formula

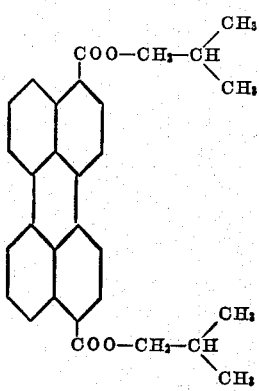

10. The isobutylester of perylene-3-carboxylic acid.

KARL KOEBERLE.
OTTO SCHLICHTING.